(12) United States Patent
Frank et al.

(10) Patent No.: US 12,088,226 B2
(45) Date of Patent: Sep. 10, 2024

(54) ESTIMATION OF ROTOR OPERATIONAL CHARACTERISTICS FOR A WIND TURBINE

(71) Applicant: Siemens Gamesa Renewable Energy A/S, Brande (DK)

(72) Inventors: Jared Frank, Longmont, CO (US); Kirk Pierce, Lafayette, CO (US)

(73) Assignee: Siemens Gamesa Renewable Energy A/S, Brande (DK)

( * ) Notice: Subject to any disclaimer, the term of this patent is extended or adjusted under 35 U.S.C. 154(b) by 200 days.

(21) Appl. No.: 17/631,782

(22) PCT Filed: Jul. 22, 2020

(86) PCT No.: PCT/EP2020/070705
§ 371 (c)(1),
(2) Date: Jan. 31, 2022

(87) PCT Pub. No.: WO2021/023515
PCT Pub. Date: Feb. 11, 2021

(65) Prior Publication Data
US 2022/0278637 A1    Sep. 1, 2022

(30) Foreign Application Priority Data
Aug. 8, 2019   (EP) .................................... 19190639

(51) Int. Cl.
*H02P 23/14*   (2006.01)
*F03D 17/00*   (2016.01)
(Continued)

(52) U.S. Cl.
CPC .............. *H02P 23/14* (2013.01); *F03D 17/00* (2016.05); *G01D 5/2457* (2013.01);
(Continued)

(58) Field of Classification Search
CPC ....... H02P 23/14; F03D 17/00; G01D 5/2457; G01D 18/001; G01P 3/489; G01P 13/045; H02K 7/183
See application file for complete search history.

(56) References Cited

U.S. PATENT DOCUMENTS 7,086,834 B2 * 8/2006 LeMieux .................. F03D 7/02
416/37
7,426,877 B2 * 9/2008 Ehrlich ................ G01D 5/2492
73/862.328
(Continued)

FOREIGN PATENT DOCUMENTS

DE         19736712 C1   2/1999
DE     102005019515 A1   12/2005
(Continued)

OTHER PUBLICATIONS

PCT International Search Report and Written Opinion of International Searching Authority mailed Nov. 25, 2020 corresponding to PCT International Application No. PCT/EP2020/070705 filed Jul. 22, 2020.

*Primary Examiner* — Rina I Duda
(74) *Attorney, Agent, or Firm* — Schmeiser, Olsen & Watts LLP

(57) ABSTRACT

Provided is a method of estimation of rotor operational characteristics, in particular rotor speed, rotor azimuth and rotation direction, of a rotating rotor of a wind turbine, the method including: measuring pulse rising edge time and pulse falling edge time of pulses generated by each of multiple proximity sensors originating from multiple detection targets arranged on the rotor; estimating values of parameters associated with the sensors and/or targets, in particular parameters associated with the positioning and/or detection range of at least one sensor and/or the parameters associated with the positioning and/or size of at least one (Continued)

target, based on the measured pulse rising edge times and pulse falling edge times; estimating rotor operational characteristics, in particular a rotor speed and/or a rotor azimuth and/or a rotation direction, based on the measured pulse rising and/or falling edge times and/or the estimated values of parameters associated with the sensors and/or targets.

15 Claims, 4 Drawing Sheets

(51) Int. Cl.
| | | |
|---|---|---|
| *G01D 5/245* | (2006.01) | |
| *G01D 18/00* | (2006.01) | |
| *G01P 3/489* | (2006.01) | |
| *G01P 13/04* | (2006.01) | |
| *H02K 7/18* | (2006.01) | |

(52) U.S. Cl.
CPC ............ *G01D 18/001* (2021.05); *G01P 3/489* (2013.01); *G01P 13/045* (2013.01); *H02K 7/183* (2013.01)

(56) References Cited

U.S. PATENT DOCUMENTS

| | | | | |
|---|---|---|---|---|
| 7,822,560 | B2* | 10/2010 | LeMieux | ............... F03D 7/042 |
| | | | | 324/207.16 |
| 7,840,370 | B2 | 11/2010 | Kulczyk et al. | |
| 7,874,797 | B2* | 1/2011 | Pierce | .................... F03D 7/042 |
| | | | | 416/61 |
| 7,988,414 | B2* | 8/2011 | Benito | .................. F03D 7/0224 |
| | | | | 416/44 |
| 8,029,233 | B2* | 10/2011 | Hoffmann | ............ F03D 7/0276 |
| | | | | 415/118 |
| 8,215,905 | B2* | 7/2012 | Slack | ................... G01L 5/0019 |
| | | | | 416/1 |
| 9,209,726 | B2 | 12/2015 | Kaufmann et al. | |
| 2009/0102467 | A1 | 4/2009 | Snell et al. | |

FOREIGN PATENT DOCUMENTS

| | | |
|---|---|---|
| FR | 2897944 A1 | 8/2007 |
| WO | 0008475 A1 | 2/2000 |

* cited by examiner

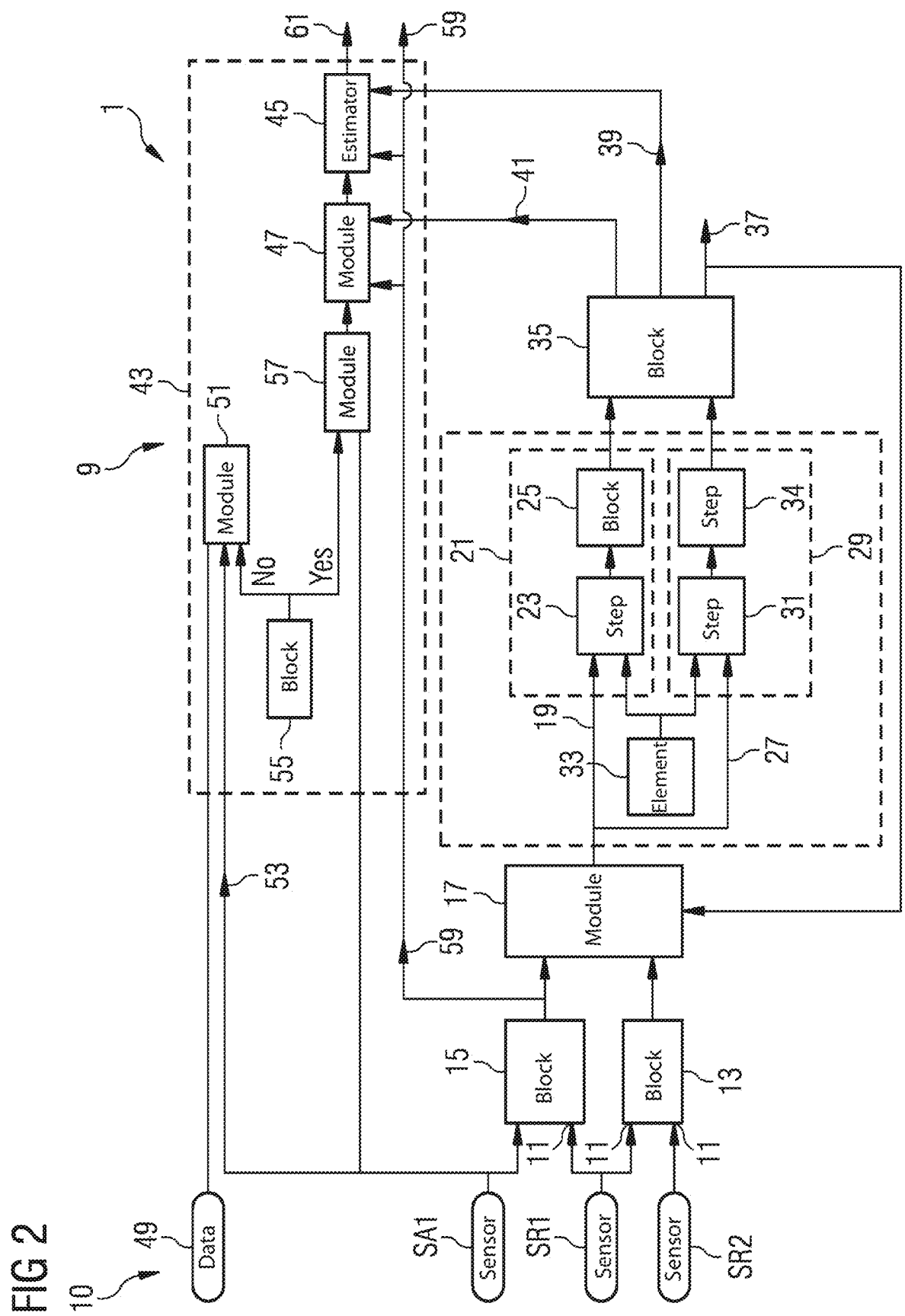

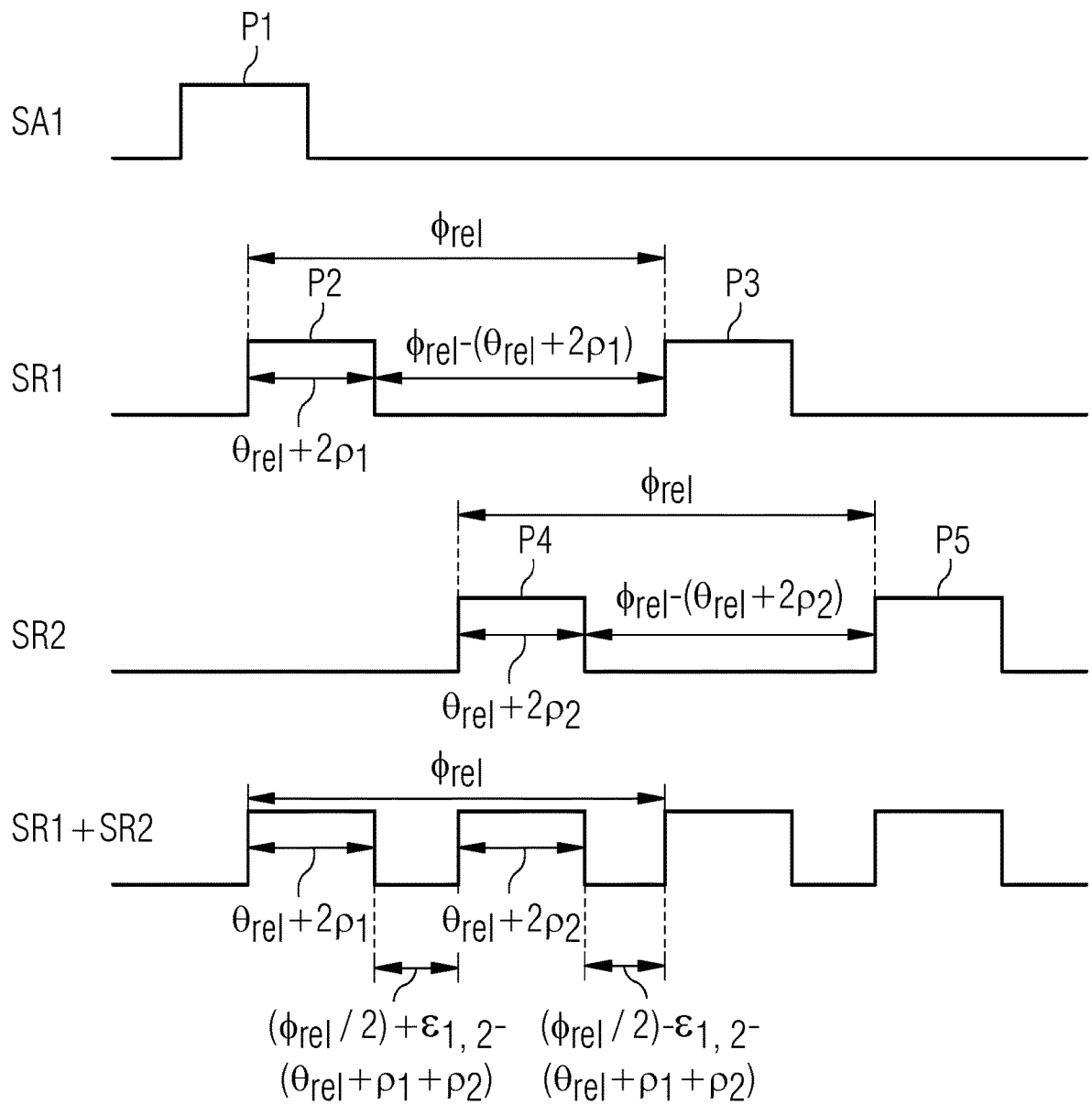

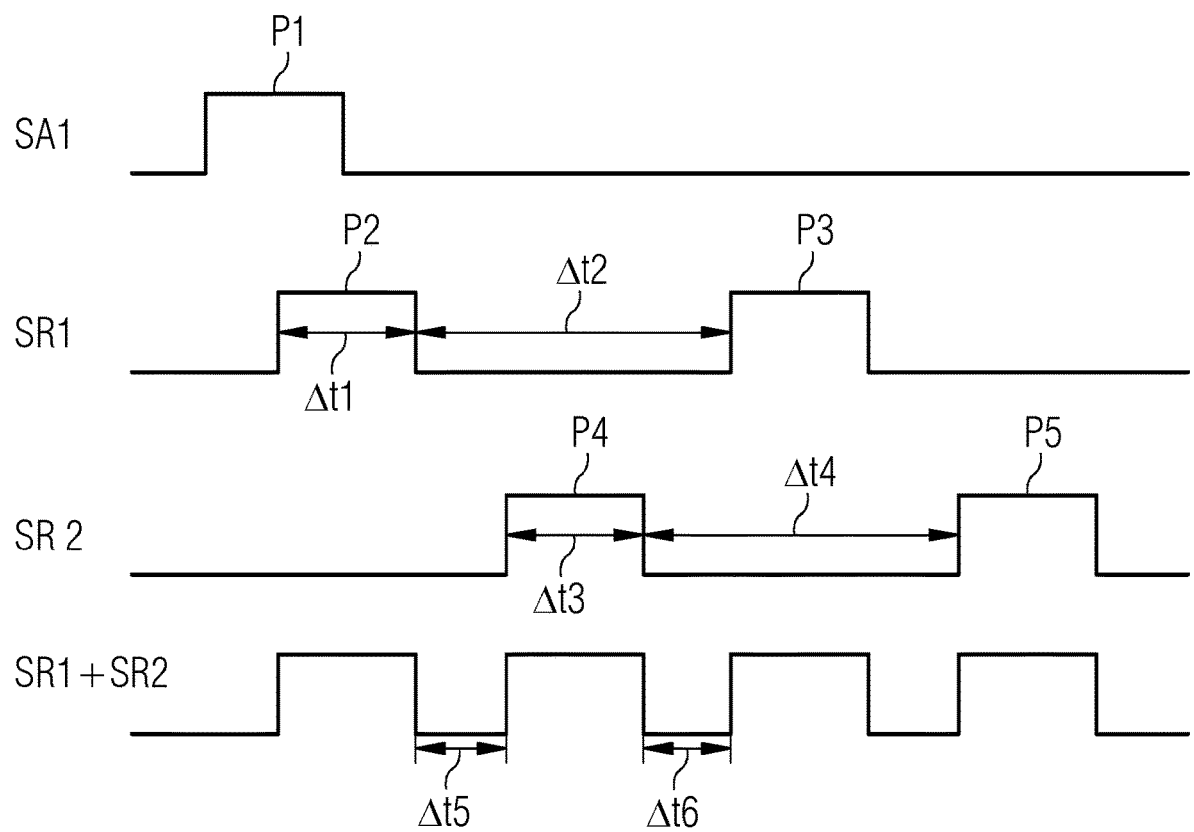

ESTIMATION OF ROTOR OPERATIONAL CHARACTERISTICS FOR A WIND TURBINE

CROSS-REFERENCE TO RELATED APPLICATIONS

This application claims priority to PCT Application No. PCT/EP2020/070705, having a filing date of Jul. 22, 2020, which claims priority to EP Application No. 19190639.5, having a filing date of Aug. 8, 2019, the entire contents both of which are hereby incorporated by reference.

FIELD OF TECHNOLOGY

The following relates to a method and to an arrangement for estimation of rotor speed, azimuth and rotation direction of a rotating rotor of a wind turbine and further relates to a wind turbine comprising the arrangement.

BACKGROUND

A wind turbine may comprise a wind turbine tower, a nacelle mounted on top of the wind turbine tower, wherein the nacelle harbors a main rotor shaft at which plural rotor blades are mounted and which is coupled to an electric generator which generates electric energy upon rotation of the main rotor.

The determination of rotor operational characteristics, such as rotor speed, rotor azimuth and rotation direction may be necessary for properly controlling the wind turbine. For determination of the rotor operational characteristics one or more sensors may be installed at different locations of the wind turbine. Conventional methods and arrangements for estimating rotor operational characteristics often make use of proximity sensors that generate digital pulses when they detect a passing target. Methods and arrangements that use proximity sensors encounter various obstacles that compromise their accuracy and robustness. For example, some methods are only capable of producing estimates for one rotor operational characteristic, namely the rotational speed, whereas other characteristics necessary for proper control of the wind turbine, such as rotor azimuth and direction of rotation, must be estimated using an alternative method based around different sensing hardware.

Methods using proximity sensors often require parts to be especially fabricated with high precision to serve as targets for detection by the sensors, which can add a non negligible cost to the turbine. Since the pulse trains generated by proximity sensors are directly related to the size and spacing of the detection targets, methods that do not account for potential imperfections in the fabrication of the targets have difficulty providing accurate estimates of rotor operational characteristics when machining tolerances have not been met. Moreover, sensors can be placed such that they are misaligned with the targets or, in arrangements that use multiple sensors, misaligned with each other enough to compromise the reliability of the measurements. In addition, vibrations of the wind turbine and/or the components to which the sensors and targets are mounted can vary the alignment between the sensors and targets enough to produce erroneous pulses or to miss pulses, resulting in inaccurate estimates of the rotor operational characteristics.

Methods normally do not use all the information available from the pulse trains generated by the sensors. In particular, methods are often based around the timing or counting of one of the edges of the pulses (i.e., either the rising or the falling edge) when a second edge is also available for detection and can be employed to algorithmically compensate for uncertainties in sensor properties. Moreover, methods that make use of only a single sensor lack measurement redundancy, which can be leveraged to detect sensor faults (e.g., missed pulses or erroneous pulses), increase sampling rates, and reduce sensitivity to vibrations, sensor specifications, sensor placement, target fabrication quality, etc.

Thus, there may be a need for a more robust method and an arrangement for estimation of rotor operational characteristics, in particular rotor speed, rotor azimuth and rotation direction of a rotating rotor of a wind turbine that uses proximity sensors, and there may be a corresponding need for a wind turbine comprising the arrangement.

SUMMARY

According to an embodiment of the present invention, it is provided a method of estimation of rotor operational characteristics, in particular rotor speed, rotor azimuth and rotation direction, of a rotating rotor of a wind turbine, the method comprising: measuring pulse rising edge time and pulse falling edge time of pulses generated by each of multiple proximity sensors originating from each of multiple detection targets arranged on the rotor; estimating values of parameters associated with the sensors and/or targets, in particular parameters associated with the positioning and/or detection range of at least one sensor and/or parameters associated with the positioning and/or size of at least one target, based on the measured pulse rising edge times and pulse falling edge times; estimating rotor operational characteristics, in particular a rotor speed and/or a rotor azimuth and/or a rotation direction, based on the measured pulse rising edge times and pulse falling edge times and the estimated values of parameters associated with the sensors and/or targets.

Estimation of the rotor operational characteristics and unknown parameters associated with the sensors and/or targets may be implemented partly in software and/or hardware. The method may be executed by a wind turbine controller, in particular a module or particular unit of the wind turbine controller. Thereby, the controller may receive measurement results as obtained from the multiple proximity sensors. The controller may process the measurement results in order to estimate the rotor operational characteristics.

A proximity sensor may be mounted at any portion of the wind turbine which is stationary relative to the rotating rotor. In particular, multiple proximity sensors may be mounted at different azimuthal positions. Moreover, some of the proximity sensors may have same, some may have different radial positions.

The multiple detection targets may at least partly be formed by holes which are comprised in a conventional rotor or which are at least not especially fabricated. The proximity sensor may also detect the presence of a hole which is surrounded by material, since the hole, i.e., absence of target material, will cause an interruption in the detection of the surrounding target material. Thus, at least some of detection targets may be formed by missing target material surrounded by target material. The multiple detection targets may be positioned at different azimuthal positions. Some of the targets may have same, some may have different radial positions.

When one of the multiple detection targets approaches one of the proximity sensors, the respective sensor may output a pulse comprising a rising edge and a falling edge. The pulse may be characterized by the point in time when the rising edge occurs, i.e., the pulse rising edge time, and also the point in time when the falling edge occurs, i.e. the pulse falling edge time. The pulse rising edge time and/or the pulse falling edge time of pulses generated by each of the multiple proximity sensors originally originating from multiple detection targets arranged on the rotor may depend on the rotor speed, rotor azimuth and rotation direction. Thus, these pulse rising edge times and pulse falling edge times may be suitable to derive therefrom the rotor operational characteristics, in particular rotor speed, rotor azimuth and rotation direction.

According to an embodiment of the present invention, the detection targets are not necessarily regularly positioned to a high precision, but may have positional tolerances, for example within as much as 1% or more of the intended azimuthal and/or radial placement. Generally, the multiple detection targets may be arranged at plural different azimuthal positions around the entire circumference of the rotor. When pre-existing holes or recesses are employed as at least some of the multiple detection targets, these do not need to be machined especially for the purpose of estimation of rotor operational characteristics. Thereby, costs of producing or manufacturing the rotor may be reduced.

The method may also be capable of estimating and compensating for inaccuracies or uncertainties in the positionings of the multiple detection targets and/or the multiple proximity sensors, and/or in the detection ranges of the sensors. Furthermore, the multiple detection targets may not all be arranged or mounted at a same radial position (as measured from a rotation axis of the rotor) but may also comprise in the radial direction different radial positions. The same may hold for the multiple proximity sensors. However, approximative positions of the multiple proximity sensors as well as approximative positions of the multiple detection targets may be pre-known and utilized by the method for estimation of the rotor operational characteristics.

When plural proximity sensors are utilized to detect plural detection targets, the reliability of the method may be improved. Furthermore, there may be less strict requirements regarding the exact positioning of the detection targets and/or the proximity sensors. Thereby, costs of the arrangement and the measurement equipment and the rotor may be reduced.

Embodiments of the present invention provide a cost-effective, algorithmically sophisticated proximity-based solution which is feasible to provide measurements of rotor speed, azimuth, and direction of rotation, that is less sensitive to vibrations, sensor specifications, and machining tolerances than conventionally known methods.

According to an embodiment of the present invention, the estimating the rotor speed and/or the rotor azimuth and/or the rotation direction is further based on sensor positioning parameters of at least one sensor and/or a sensor detection range of at least one sensor and/or target positioning parameters and/or target size parameters of at least one target, in particular based on target diameters and/or target angular size of at least one target, and/or target relative angular spacing of at least one pair of targets, and/or sensor-target radial distance of at least one pair of sensor and target, and/or a sensor detection angular range of at least one sensor, and/or sensor relative angular spacing of at least one pair of sensors.

The sensor positioning parameters may comprise parameters regarding an azimuthal and/or radial and/or axial position of the respective sensor. The sensor detection range of at least one sensor may define a sensor viewing range or area. The target position parameters may comprise parameters regarding the radial and/or azimuthal and/or axial position of the respective target. The target size parameters may for example comprise parameters regarding a radial size (radial extension for example) and/or an azimuthal extension (for example given in degrees) of the respective target.

For example, the difference between a pulse rising edge time and a pulse falling edge time of a pulse detected by one sensor originating from a particular target may be dependent on the target azimuthal extent as well as on the rotor speed. Furthermore, this difference may be dependent on the sensor detection angular range, i.e., for example the azimuthal range over which the considered sensor is capable to detect a target. At least rough or approximative values of the sensor positional parameters and/or the target positioning parameters and/or the target size parameters may be pre-given or pre-known and may be utilized by the method.

According to an embodiment of the present invention, the method further comprises estimating the sensor positioning parameters of at least one sensor and/or a sensor detection range and/or the target positioning parameters and/or the target size parameters of at least one target based on the measured pulse rising edge times and pulse falling edge times, wherein estimating the unknown parameters and/or rotor operational characteristics may be based on a measurement model, in particular a mathematical model relating the measured pulse rising edge times and pulse falling edge times to the rotor operational characteristics and/or the parameters associated with the sensors and/or targets.

As has been stated above, the exact sensor positioning parameters and/or sensor detection ranges and/or target positioning parameters and/or target size parameters may be unknown when the method is started. However, the values of these parameters may be estimated based on the redundant measurement of pulses by multiple sensors originating from multiple detection targets. For example, a particular detection target may be measured by the multiple proximity sensor in a redundant manner, allowing to deduce or derive the values of the sensor positioning parameters and/or sensor detection ranges and/or target positioning parameters and/or target size parameters.

The model may be represented by a set of equations relating the unknown parameters and rotor operational characteristics to the measured rising times and falling times. The set of equations may be solved by the method of least squares, in particular in a recursive manner, in particular by an iteration.

According to an embodiment of the present invention, estimating the rotor speed and/or the rotor azimuth and/or the rotation direction and/or the values of parameters, in particular specifically for each of the sensors and/or targets, includes applying an adaptive filter to the measurement model relating these quantities to the measured rising times and falling times.

After the values of the parameters have been estimated, the respective parameters may be updated to new sensor positioning parameters and/or new sensor detection ranges and/or new target positioning parameters and/or new target size parameters which may then be utilized in the method further on. Thereby, the estimation of the rotor operational characteristics may be compensated for the uncertainties in the arrangement of sensors and/or targets. Thereby, the accuracy or reliability of the estimation of the rotor operational characteristics may be improved.

According to an embodiment of the present invention, the estimation of the rotor speed and/or the rotor azimuth and/or the rotation direction and/or estimating the parameters associated with the sensors and/or targets is based on at least one of: measured times of pulses being high and times of pulses being low as detected by at least one sensor; measured times between (e.g. rising edges or falling edges of) pulses as detected by at least one pair of sensors.

The time of a pulse being high may be the difference between a pulse falling edge time and a pulse rising edge time of the considered pulse. The time of pulses being low may be the difference between a pulse rising edge time of a next pulse and a pulse falling edge time of a previous immediately adjacent pulse. The times of pulses being high and time of pulses being low may depend on the rotor speed, angular target extent and azimuthal or angular distance between adjacent targets.

The measured time between pulses may also be regarded as times of pulses being low according to an embodiment of the present invention. The time difference between for example rising edges of pulses as detected by at least one pair of sensors originating from a same detection target may depend on the rotor speed and the angular distance between the proximity sensors but may not depend on the angular extent of the considered target. Thereby, the rotor speed may be measured independently from the angular extent of the target. Thereby, the method may still be improved.

According to an embodiment of the present invention, the sensors comprise at least one reference (also referred to as absolute) sensor and at least one relative sensor. The reference sensor(s) as well as the relative sensor(s) may be of same or similar type or construction or may have different construction and different type. Measurement results of all the sensors may be converted to values relative to a reference sensor. Thus, a reference or absolute sensor may set a particular coordinate system, in particular angular coordinate system relative to which measurement results of all the other sensors may be interpreted. The conversion of the measurement results of the other different relative sensors may be made using the sensor positioning parameters of the relative sensors and the reference sensors.

According to an embodiment of the present invention, the targets comprise: a reference (also referred to as absolute) target; and at least one relative target, wherein pulses originating from the reference target can only be generated by detections from a reference sensor and can thus be distinguished from pulses originating from a relative target, which can only be generated by detections from a relative sensor.

The reference or absolute target may have for example a different azimuthal and/or radial size and/or a different azimuthal and/or radial position than the relative target(s). The reference or absolute target may have been directly mounted at the rotor and may have been especially manufactured for the purpose serving as a reference target. The one or more relative targets may substantially all be structured or sized equally or at least approximately equally. However, the relative target(s) may be formed by a pre-existing structure in the rotor thus not being especially manufactured or provided for the purpose of serving as a relative target for estimation of rotor operational characteristics.

According to an embodiment of the present invention, the reference target, a reference sensor ($S_{Ai}$), and a relative sensor ($S_{Ri}$) are configured and positioned such that pulses originating from the reference target, as detected by the reference sensor ($S_{Ai}$), overlap in time with pulses originating from a relative target as detected by the relative sensor ($S_{Ri}$), where i denotes the index of each relative sensor which a reference sensor has been configured and positioned to be associated with.

When the pulse as detected by a reference sensor overlaps in time with another pulse as detected by the relative sensor associated with that reference sensor, the direction of rotation may be easily detected.

The at least one reference sensor, the at least one relative sensor, the reference target and the at least one relative target may be positioned, in particular regarding a respective radial position, such that: each of the at least one relative target is out of the sensor detection range of the at least one reference sensor; and each of the at least one reference target is out of the sensor detection range of each of the at least one relative sensor.

According to an embodiment of the present invention, estimating the direction of rotation includes: detecting whether the reference sensor ($S_{Ai}$) or its associated relative sensor ($S_{Ri}$) first detects its corresponding target.

Other procedures for estimating or detecting the direction of rotating rotation may be employed, for example not utilizing signals as originating from the reference target but signals or pulses originating from any of the other relative target(s).

According to an embodiment of the present invention, a reference azimuth position is detected when the reference sensor detects a pulse originating from the reference target, wherein a mounting position of the reference sensor is determined by calibration using external azimuth measurement.

An external azimuth measurement may be simultaneously or subsequently performed during a calibration procedure with the recording of the pulse. Then, a particular point in time in the phase of the pulse being high, may be associated with the azimuth position as measured by the external azimuth measurement. Thereby, an accurate calibration of the azimuth estimation may be achieved.

According to an embodiment of the present invention, the method further comprises determining a difference between subsequent pulse rising edge times and/or a pulse falling edge times of a first pulse and a subsequent second pulse, the first and second pulses detected by any of the at least one relative sensor and originating from any of the at least one relative target, wherein estimating the rotor azimuth is based on a previously estimated rotor azimuth increased or decreased, depending on estimated rotation direction, by an integral of the estimated rotor speed over the difference.

The two pulses whose respective pulse rising edge times and pulse falling edge times are determined may originate from any combination of sensors and targets. For example, the two pulses may originate from detections of two adjacent targets by the same relative sensor, detections of the same target by two adjacent sensors, or the detections of two adjacent targets by two adjacent sensors. The difference, which may depend on the rotor speed, may reflect the time needed for a target to reach the position of its adjacent target, the time needed for a target to travel from one sensor to another sensor, or the time between when two adjacent sensors each detect two adjacent targets, respectively. Taking into account the estimated rotor speed and in particular integrating the estimated rotor speed over the determined difference may represent an azimuth increment or decrement which may be added to the previously estimated rotor azimuth to obtain the actual rotor azimuth.

According to an embodiment of the present invention, the method further comprises validating of at least one of the sensors by making a (one or several) consistency check of measurement results of this sensor and the estimated rotor speed and/or estimated rotor azimuth; and disqualifying of one sensor if it does not pass the consistency check.

The redundancy of measurement enables the consistency check during the validation. Thereby, one or more sensors may be identified which provide erroneous results due to one or more problems, such as damage, improper function/positioning, or the like. The disqualified sensor may not be utilized in the method any more. In particular, measurement results provided or detected by this sensor may not be utilized for estimation of the rotor operational characteristics.

According to an embodiment of the present invention, the method further comprises, if only one sensor passes the consistency check: estimating the rotor speed based on pulse high and pulse low time measurements of only the sensor having passed the consistency check.

The time range during which a pulse is high, may depend on the rotor speed. Thereby, rotor speed estimation is even possible if only one sensor has been assessed as a proper functioning sensor.

It should be understood that features, individually or in any combination, disclosed, explained, described or provided for a method of estimation of rotor speed, azimuth and rotation direction of a rotating rotor of a wind turbine are also, individually or in any combination, applicable to an arrangement for estimation of rotor speed, azimuth and rotation direction (in general rotor operational characteristics) of a rotating rotor of a wind turbine according to embodiments of the present invention and vice versa.

According to an embodiment of the present invention, it is provided an arrangement for estimation of rotor speed, azimuth and rotation direction of a rotating rotor of a wind turbine, the arrangement comprising: multiple proximity sensors; wherein the arrangement is configured: to measure pulse rising edge time and pulse falling edge time of pulses generated by each of the multiple proximity sensors originating from multiple detection targets arranged on the rotor; and to estimate rotor operational characteristics, in particular a rotor speed and/or a rotor azimuth and/or a rotation direction, based on the measured pulse rising edge times and pulse falling edge times.

The arrangement may for example be comprised or implemented as a hardware and/or software module of a wind turbine controller.

Furthermore, according to an embodiment of the present invention, it is provided a wind turbine, comprising: a rotor at which plural rotor blades are mounted; an arrangement according to the preceding embodiment.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which embodiments of the invention is not limited.

BRIEF DESCRIPTION

Some of the embodiments will be described in detail, with reference to the following figures, wherein like designations denote like members, wherein:

FIG. 1 schematically illustrates a portion of a wind turbine according to an embodiment of the present invention comprising an arrangement for estimation of rotor operational characteristics according to an embodiment of the present invention;

FIG. 2 schematically illustrates a conceptional circuit diagram of an arrangement for estimation of rotor operational characteristics of a rotating rotor of a wind turbine according to an embodiment of the present invention;

FIG. 3 illustrates the modelled angular distances; and

FIG. 4 illustrates the corresponding measured time differences associated with sensor pulse traces of several sensors as considered in embodiments of the present invention.

DETAILED DESCRIPTION

Figure 1:
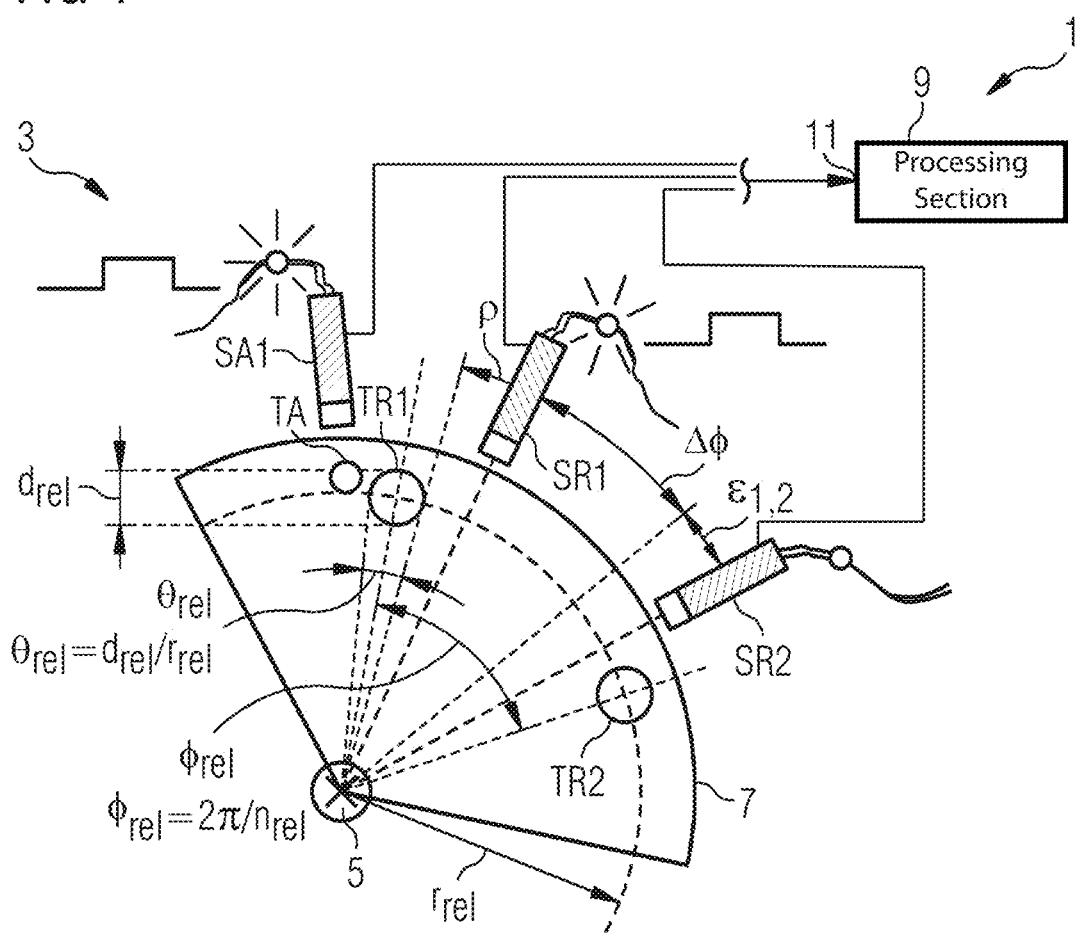

The portion 3 of a wind turbine according to an embodiment of the present invention schematically illustrated in FIG. 1 in a sectional view along an axial direction 5 (direction of a rotation axis of a rotor) comprises an arrangement 1 for estimation of rotor operational characteristics of a rotating rotor 7 according to an embodiment of the present invention. A schematic circuit diagram of the arrangement 1 is also depicted in FIG. 2 which will be described below.

The arrangement 1 comprises multiple inductive proximity sensors $S_{A1}$, $S_{R1}$, $S_{R2}$ which are mounted (in particular close to a frontal face of a rotor lock disk) at a not in detail illustrated stationary portion near to the main bearing of the wind turbine 3. The absolute inductive proximity sensor $S_{A1}$ is mounted at a different radial position, in particular further outwards, from the centre of rotation than the relative sensors $S_{R1}$, $S_{R2}$. The arrangement 1 is configured to measure pulse rising edge time and pulse falling edge time of pulses (see for example FIG. 4) P1, P2, P3, P4, P5, generated by each of the multiple inductive proximity sensors $S_{A1}$, $S_{R1}$, $S_{R2}$ originating from an absolute target $T_A$ and two of multiple relative targets $T_{R1}$, $T_{R2}$, . . . , $T_{Rn}$ which are arranged at the rotor 7. The absolute target $T_A$ is mounted at a different radial position than the relative targets $T_{R1}$, $T_{R2}$, . . . , $T_{Rn}$. The absolute target $T_A$ can only be detected by the absolute sensor (but not any of the relative sensors) and the relative targets $T_{R1}$, $T_{R2}$, . . . , $T_{Rn}$ can only be detected by one of the relative sensors (but not the absolute sensor).

The arrangement 1 is further configured to estimate the rotor operational characteristics based on the measured pulse rising edge times and pulse falling edge times.

Rather than utilize and mount only one proximity sensor to detect targets on a dedicated, precision-machined rotating part, embodiments of the present invention propose to utilize and mount multiple (inductive) proximity sensors to detect targets already pre-existing at a rotating part, and in particular at the rotor 7. In particular, the rotor lock disk near the main bearing of the wind turbine may be a part including the detection targets $T_A$, $T_{R1}$, $T_{R2}$, . . . , $T_{Rn}$ which are monitored by the sensors $S_{A1}$, $S_{R1}$, $S_{R2}$. Although only three sensors are depicted in FIG. 1, other embodiments of the present invention utilize more than three sensors, such as four, five, six or in-between three and 50 or even more.

In particular, the absolute target '$T_A$' (also referred to as reference target) may be realized by a (iron) ferrous piece to be detected by the absolute sensor $S_{A1}$, while the relative targets $T_{R1}$, $T_{R2}$, . . . , $T_{Rn}$ may each be a previously-machined hole around the circumference of the ferrous disk acting as the relative target to be detected by the relative sensors $S_{R1}$, $S_{R2}$. However, any combination of holes, exposed bolt heads, gear teeth, mounted pieces, etc. may be utilized as targets (in particular relative targets) according to embodiments of the present invention.

By using multiple sensors $S_{A1}$, $S_{R1}$, $S_{R2}$ embodiments of the present invention may have the benefit of being able to simultaneously estimate the rotor speed, rotor azimuth and also determine the direction of the rotation. Further advantages may include measurement redundancy that may allow for improved sensor validation, robustness to vibration or to faults with individual sensors, and the ability to estimate and compensate for variations in sensor sensitivity, sensor placement, target size and target spacing. In addition, the total cost of the inductive proximity sensors may be less than alternative solutions, including the cost of precision-machined dedicated parts used by conventional inductive proximity sensor methods.

In FIG. 1 also relevant sensor positioning parameters, for example designed (or nominal) azimuthal distance between adjacent sensors, labelled as $\Delta \varphi$ and misalignment $\varepsilon_{1,2}$ between sensors $S_{R1}$ and $S_{R2}$ are depicted in FIG. 1. Furthermore, target positioning parameters, such as the radial and/or circumferential positioning of the absolute target $T_A$, the radial and/or azimuthal positioning of the relative targets $T_{R1}$, $T_{R2}$ are indicated in FIG. 1. Furthermore, target size parameters, such as the relative target diameter $d_{rel}$, the azimuthal relative target size $\Theta_{rel}$ are indicated in FIG. 1. Furthermore, target relative positioning parameters, such as relative target spacing $\Phi_{rel}$ is indicated in FIG. 1. These positioning and/or size parameters of the sensors and/or targets are utilized in the algorithm to determine the direction of rotation, rotational speed and rotor azimuth.

Although the embodiment illustrated in the figures demonstrates the use of three sensors, any number of sensors more than two may be used. While q≥1 sensors (referred to as sensors $S_{A1}, \ldots, S_{Aq}$, or the "absolute sensors") each detect an absolute target $T_A$ once per revolution of the rotor, the remaining m≥1 sensors (referred to as sensors $S_{R1}$, $S_{R2}, \ldots, S_{Rm}$, or the "relative sensors") each detect multiple "relative targets" arranged around the circumference of the part n times per revolution, where n≥1 is the number of relative targets used. In the illustrated embodiment the mounted ferrous piece '$T_A$' assumes the role of the absolute target while the previous-machined holes $T_{R1}, T_{R2}, \ldots, T_{Rn}$ assume the role of the relative targets.

The arrangement 1 comprises a processing section 9 which receives measurement results 11 of all the proximity sensors $S_{A1}$, $S_{R1}$, $S_{R2}$ and processes these measurement results 11 in order to estimate the rotor operational characteristics based thereon.

FIG. 1 further indicates the sensor sensitivity $\rho$ (also referred to as azimuthal viewing range of the sensor or angular viewing range of the sensor).

The arrangement 1 is depicted in more detail in FIG. 2 as a schematic circuit diagram including the processing section 9 and the sensor section 10. The conceptional diagram illustrated in FIG. 2 may be implemented in software and/or hardware. The arrangement 1 includes the absolute sensor $S_{A1}$, a first relative sensor $S_{R1}$ and a second relative sensor $S_{R2}$. In the block 13 the pulse times of pulses as detected by the sensors $S_{R1}$ and $S_{R2}$ are measured and determined. The measurement results 11 of the absolute sensor $S_{A1}$ and the first relative sensor $S_{R1}$ are supplied to a block 15 which determines the direction of rotation of the rotor.

In a module 17 a pre-validation of the proximity sensor is carried out, wherein the measurement results for the different sensors are assessed for consistency.

If it is determined that multiple sensors are valid, it is branched into the branch 19 which leads to a multiple sensor estimator 21. Therein, the measurement results of multiple sensors are utilized. In a calibration step 23, the relevant parameters, such as sensor positioning parameters and/or target positioning parameters and target size parameters are calibrated based on the pulse measurements 11. In a method block 25 the rotor speed and the change in the azimuth is estimated based on the measurement results after calibrating the parameters.

When the proximity sensor pre-validation (module 17) assesses only one sensor as valid, it is branched into the branch 27 which leads to a single sensor estimation module 29. Also herein, the relevant positioning and/or sizing parameters of the sensors and/or targets are calibrated in a module or method step 31. The calibration of parameters is not always being performed, but only in the case the decision element 33 assesses that the parameters are not yet calibrated. After calibration of the parameters, it is proceeded to the method step 34 where the rotational speed and the change in azimuth is estimated based on the measurement results after calibration or using the calibrated parameters.

The multi-sensor estimator 21 as well as the single-sensor estimator 29 provide their output to a proximity sensor post-validation block 35 in which a post-validation of the proximity sensors is carried out including one or more consistency checks. The block 35 outputs the status 37 of the sensors which is fed-back to the proximity sensor pre-validation module 17.

Furthermore, the proximity sensor post-validation outputs the estimate 39 of the rotational speed. Furthermore, the proximity sensor post-validation outputs the estimation 41 of the change in the azimuth.

The estimate 39 of the rotational speed as well as the estimate 41 of the change in azimuth are both provided to a proximity-based azimuth estimator 43, namely to an integrator 45 and a relative azimuth update module 47, respectively. The proximity-based azimuth estimator 43 receives for calibration external azimuth data 49 which is supplied to an azimuth sensor calibration module 51. To this module 51 also the measurement data 53 as determined by the absolute proximity sensor $S_{A1}$ are provided.

If the decision block 55 assesses that the azimuth is not calibrated, the azimuth will be calibrated in the calibration module 51. If it is assessed that the azimuth is calibrated, an absolute azimuth update is performed in module 57 and the output is provided to the relative azimuth update module 47. This relative azimuth update module 47 further receives the signal 59 indicating the direction of rotating from the rotational direction determination module 15. The estimate 61 of the rotor azimuth is finally output by the integration module 45 and the estimation 59 of the direction rotation is also output by the arrangement 1.

As shown in FIG. 2, the algorithm not only estimates the rotor speed, azimuth, and direction of rotation, but also takes steps to calibrate the azimuth and unknown parameters. Moreover, steps are taken to validate both the input and output signals of the rotor speed estimation. This includes ensuring that there is no chatter in the sensor pulses and that the pulse time measurements and rotor speed estimates appear consistent over time. These checks on the inputs and outputs of the speed estimation are referred to as the "Pre-Validation" (block 17) and "Post-Validation" (block 35) steps, respectively. Depending on the severity and duration of the detected fault, it can either be ignored, corrected, or used to disqualify the sensor from the rotor speed estimation. Each of these responses are made within the "Pre-Validation" step, using the measurements from the sensors and the previous status reported by "Post-Validation" as inputs. In the case when the azimuth sensor is disqualified, the azimuth can continue to be estimated by using the incremental azimuth fixes at each relative target ($T_{R1}, T_{R2}, \ldots T_{Rn}$) and integrating (block 45)

the speed estimate between these targets. An absolute azimuth fix can still be performed by determining the relative target associated with the fix. This can be done by a combination of counting through the known number of relative targets and finding the edge of the target that is closest to the calibrated absolute azimuth value.

After disqualification of a speed sensor, the rotor speed and azimuth estimations can continue depending on the number of sensors that remain valid. If more than one sensor are valid, each of their pulse times as well as the times between their pulses can be used to estimate rotor speed by the multi-sensor estimator described above.

However, if only one sensor is valid, its pulse times can still be used to estimate rotor speed by a variant of the original algorithm referred to as the single-sensor estimator (block 29). This estimator performs the same function as the multi-sensor estimator (block 21) but using only the high and low time measurements associated with the one valid sensor. Thus, since the number and spacing of sensors $S_{R1}$, $S_{R2}$, ..., $S_{Rm}$ are chosen to optimize the update rate of the estimates, improving performance, the performance begins to degrade as the number of relative sensors m reduces to 1. Finally, if no valid sensors remain to be used in the estimation, an alarm must be reported by the functionality to indicate that the rotor speed and rotor azimuth cannot be estimated.

As is evident from the conceptual diagram of the proximity-based speed, azimuth, and direction estimation algorithm illustrated in FIG. 2, the algorithm first determines the direction of rotation and validates the proximity sensors before updating the rotor speed and rotor azimuth estimates using the pulses and pulse times acquired. The algorithm provides the direction of rotation, estimates of the speed and azimuth, as well as the status of the proximity sensors.

FIG. 3 schematically illustrates pulses as detected by the proximity sensors $S_{A1}$, $S_{R1}$, $S_{R2}$ and the combination of sensor $S_{R1}$ and sensor $S_{R2}$. Furthermore, the relative positioning parameters of the relative targets $\Phi_{rel}$, the relative target size (azimuthal target extent $\Theta_{rel}$ and the sensor azimuthal viewing range $\rho$ are indicated as defining for example the angular differences between a falling edge and a rising edge between subsequent pulses or a rising edge and a falling edge of one pulse.

FIG. 4 illustrates these same pulses, wherein however the time differences as determined by the arrangement 1 are indicated. From the time differences the respective rotor operational characteristics are determined and values of parameters associated with the sensors and/or targets are calibrated according to embodiments of the present invention.

As the rotor rotates, the proximity sensors $S_{A1}$, $S_{R1}$, $S_{R2}$ output binary digital signals 11, 53 indicating whether or not they detect a target. As a function of time the sensor signals resemble pulses (e.g. P1, ..., P5 in FIGS. 3, 4 for the case with an absolute target, at least two relative targets (n>1), one absolute sensor (q=1) and two relative sensors (m=2)), whose high and low times depend on the speed of the rotor as well as on the sensitivity and alignment of the sensors and on the size and spacing of the targets (see FIG. 1). An embodiment of the present invention uses computational hardware to measure the time (e.g., Δt1, Δt2, Δt3, Δt4 in FIG. 4) that each sensor's pulse is high and low, as well as the times between the pulses produced by each pair of successive sensors (e.g. Δt5, Δt6 in FIG. 4). By mapping the angular distances (see FIG. 3) associated with the sensor pulses to each of their corresponding time measurements (see FIG. 4), the rotor speed can be estimated along with the values for the unknown parameters that influence the time measurements.

For example, if any of the sensors are misaligned by various amounts around the circumference of the rotating part with respect to the other sensors, if these sensors have varied sensitivities to ferrous metal, or if the targets vary in size and placement (e.g., due to being poorly machined), an adaptive filter automatically estimates these uncertainties and compensates for them in its estimation of the rotor speed. Depending on the degree of variation between the targets, an additional step may be introduced in which compensation is applied as a function of the targets. In other words, the parameter values may be estimated separately for each individual target and the appropriate set of values would be applied when the corresponding target is encountered.

By integrating multiple proximity sensors in the solution and utilizing existing rotating machined features, embodiments of the invention remove several limitations confronting prior solutions. Since embodiments of the invention use multiple proximity sensors in the detection of targets, each target is able to be detected more than once. This measurement redundancy allows the uncertainty caused by variations in the sensors and the targets described above to be estimated and prevented from corrupting the rotor speed and azimuth estimates. Thus, the need to precisely machine the targets, and the associated cost of this process, is mitigated. By spacing the multiple proximity sensors out such that they span the distance between two consecutive targets, a sufficiently fast update rate can be achieved with significantly less targets per revolution. Misalignments in the sensors and variations in their sensitivity are automatically estimated and compensated for by the algorithm. Moreover, by attaching a unique target to be detected once per revolution by one of the sensors (i.e., the "absolute target"), accurate determination of the rotor azimuth and the direction of rotation can also be achieved.

At least one reference (a.k.a. absolute sensor) may be needed and at least one relative sensor may be needed to estimate rotor speed, azimuth, and rotation direction. Reference sensors are only able to detect the reference target and the relative sensors are only able to detect the relative targets. If the reference target was visible to the relative sensors, there would be no need for a reference sensor: direction of rotation and absolute azimuth updates could come from the relative sensors by identifying which pulse is distinct from the others and associating it with the reference target. However, this can introduce more complexity to the solution or be more inconvenient (it can be more convenient or appropriate to introduce a reference target of opposite type as the relative targets) than introducing a reference sensor. However, the reference sensor and target may be moved out of range from the relative sensors/targets, otherwise the reference and relative sensors will become functionally equivalent.

There may be two types of targets, e.g., metal and absence of metal (i.e., holes). Often it may be convenient to attach a reference target that is the opposite type as the relative targets. In this case a reference sensor is required to detect the reference target type, since the relative sensors have been mounted and positioned to trigger upon detection of the relative target type. In other cases, it is more convenient to attach a reference target that is the same type, however as mentioned above, it must be out of range of the relative sensors.

To improve aspects of the solution such as accuracy, robustness to individual sensor faults, increased update rate, it may become beneficial to introduce additional reference and/or relative sensors. With more reference sensors, there is simply more robustness to faults with one or more reference sensors. However, with more relative sensors, there is an increase in the update rate of the estimated rotor characteristics, increased robustness to individual sensor faults, but also the solution has increased abilities, including the ability to estimate the size of and spacing between the relative targets.

One alternative to using reference targets and reference sensors is to leverage the extra ability of estimating the sizes of and spacings between the relative targets: since each real target would be expected to have a slightly different size and spacing, each relative target could be directly identified according to the unique values it has for these parameters. However, this would require that the target fabrication be imprecise enough to be detected by the sensitivity and resolution of the hardware/software used in the solution. Again, it may be more feasible to simply use a reference target and reference sensor(s).

The reference target and reference sensor may be placed such that the pulse generated by the reference sensor when detecting the reference target will overlap with a pulse generated by the relative sensor when detecting a relative target.

The model according to one embodiment is described in detail below:

When relating the modelled angular distances and measured times associated with the pulses originating from the detection of a target by two relative sensors (m=2), the following equations are obtained:

$$\theta_{rel} + 2\rho_1 = (\omega \times \Delta t_{X2S1F}) \quad (1)$$

$$\phi_{rel} - (\theta_{rel} + 2\rho_1) = (\omega \times \Delta t_{X2S1R})$$

$$\theta_{rel} + 2\rho_2 = (\omega \times \Delta t_{X2S2F})$$

$$\phi_{rel} - (\theta_{rel} + 2\rho_2) = (\omega \times \Delta t_{X2S2R})$$

$$(\phi_{rel}/2) + \epsilon_{1,2} - (\theta_{rel} + \rho_1 + \rho_2) = (\omega \times \Delta t_{X4S2R})$$

$$(\phi_{rel}/2) - \epsilon_{1,2} - (\theta_{rel} + \rho_1 + \rho_2) = (\omega \times \Delta t_{X4S1R}).$$

where $\omega$ is the average rotor angular speed as exhibited by the target. In these equations, some variables are known constants, some variables are unknown and must be estimated, while some variables are measurements of low and high times obtained by counter modules at the rising edge and falling edge of sensor pulses, respectively. The terms on the left hand side of eq. (1) correspond to the angular distances travelled by each target as it passes sensor $S_{R1}$ and sensor $S_{R2}$ to produce the pulse traces given in FIG. 3. The difference times on the right hand side of eq. (1) correspond to the time differences measured by sensor $S_{R1}$ and sensor $S_{R2}$ in FIG. 4.

The variables $\phi_{rel}$ and $\theta_{rel}$ are the angular spacing (in degrees) between the relative targets and the angular width (in degrees) of the relative targets, respectively. Moreover, $\rho_1$ and $\rho_2$ are angular quantities that represent the error in the width of the pulses (affecting the high times measured) produced by $S_{R1}$ and $S_{R2}$, respectively, which is caused by uncertainties in the sensitivities of the sensors compared to the specifications given by the sensor manufacturer (e.g., due to variations in temperature, input voltage, wear, etc.).

The initial values assumed for $\rho_1$ and $\rho_2$ can be determined using the specifications found in the datasheets for the sensors. Note that the sign convention taken for $\rho_1$ and $\rho_2$ is as follows: positive values will tend to expand the pulse widths from the sensors while negative values will tend to reduce the pulse widths. Thus, sensors configured to detect metal targets (e.g., bolt heads, gear teeth, attached pieces, etc.) will tend to have positive values for these parameters while sensors configured to "detect" holes or gaps will tend to have negative values. In addition to these parameters, $\epsilon_{1,2}$ is an angular quantity that represents the error in the spacing between $S_{R1}$ and $S_{R2}$ (i.e., the deviation from the ideal spacing of $\phi_{rel}/2$ affecting the low times measured). Since the true value of this misalignment should be relatively small in either direction, an initial value of zero is assumed for $\epsilon_{1,2}$. Note that the sign convention taken for $\epsilon_{1,2}$ is as follows: positive values for this parameter will tend to expand the distance and measured time from the falling edge of $S_{R1}$ to the rising edge of $S_{R2}$ while reducing the distance from the falling edge of $S_{R2}$ to the rising edge of $S_{R1}$, with negative values having the reverse effect. In the case of more than two speed sensors, positive values of $\epsilon_{k-1,k}$ can be thought of as expanding the distance on the left side of the pulse from Sensor k while reducing the distance on the right side of this pulse.

The measurements of high and low times have subscripts that adhere to a particular convention. Measurements whose subscripts begin with 'X2' are obtained by monitoring the pulse trains associated with only one sensor and thus consist of 2 edges (i.e., one rising and one falling) per period. Meanwhile, measurements whose subscripts begin with 'X4' are obtained by monitoring the pulse trains from all of the available relative sensors together: in the case where m=2, these are the pulse trains that consist of 4 edges (i.e., two per sensor) per target; thus, the subscripts 'X4' are used. While the measurements that end in 'R' are obtained at the rising edge of $S_{R1}$ or $S_{R2}$, measurements ending in 'F' are obtained at the falling edge of that sensor. Although six equations are listed in (1), only four of them are independent. With four unknowns to be estimated (i.e., $\omega$, $\rho_1$, $\rho_2$, and $\epsilon_{1,2}$), this is enough information to complete the estimation. Fortunately, it can be shown that, by dividing both sides of (1) by $\omega$ the equations can be made linear in the unknowns:

$$\theta_{rel}\frac{1}{\omega} + 2\tilde{\rho}_1 = \Delta t_{X2S1F} \quad (2)$$

$$(\phi_{rel} - \theta_{rel})\frac{1}{\omega} - 2\tilde{\rho}_1 = \Delta t_{X2S1R}$$

$$\theta_{rel}\frac{1}{\omega} + 2\tilde{\rho}_2 = \Delta t_{X2S2F}$$

$$(\phi_{rel} - \theta_{rel})\frac{1}{\omega} - 2\tilde{\rho}_2 = \Delta t_{X2S2R}$$

$$(\phi_{rel}/2 - \theta_{rel})\frac{1}{\omega} - \tilde{\rho}_1 - \tilde{\rho}_2 + \tilde{\epsilon}_{1,2} = \Delta t_{X4S2R}$$

$$(\phi_{rel}/2 - \theta_{rel})\frac{1}{\omega} - \tilde{\rho}_1 - \tilde{\rho}_2 - \tilde{\epsilon}_{1,2} = \Delta t_{X4S1R}.$$

Note that formulating (2) involved a transformation of variables: rather than being linear in the original unknowns (i.e., $\omega$, $\rho_1$, $\rho_2$, and $\epsilon_{1,2}$), (2) is linear in $$\frac{1}{\omega},$$

$\tilde{\rho}_1$, $\tilde{\rho}_2$, and $\tilde{\epsilon}_{1,2}$, where $\tilde{\rho}_1 = \rho_1/\omega$, $\tilde{\rho}_2 = \rho_2/\omega$, and $\tilde{\epsilon}_{1,2} = \epsilon_{1,2}/\omega$. Therefore, the procedure to estimate all four original parameters involves first estimating the values of $$\frac{1}{\omega},$$

$\tilde{\rho}_1$, $\tilde{\rho}_2$, and $\tilde{\epsilon}_{1,2}$, calculating the reciprocal of to obtain the speed estimate, and then multiplying the speed estimate by $\tilde{\rho}_1$, $\tilde{\rho}_2$, and $\tilde{\epsilon}_{1,2}$ to yield $\rho_1$, $\rho_2$, and $\epsilon_{1,2}$, respectively. To estimate $$\frac{1}{\omega},$$

$\tilde{\rho}_1$, $\tilde{\rho}_2$, and $\tilde{\epsilon}_{1,2}$, a linear least mean squares (LMS) filter is applied that recursively adjusts their values until their mean-square error is minimized. However, note that only 4 of the 6 measurements are used to perform the estimation. If both sensors are deemed to be performing well, the measurements $\Delta t_{X2S1F}$, $\Delta t_{X4S2R}$, $\Delta t_{X2S2F}$, and $\Delta t_{X4S1R}$ are related to the unknowns in the matrix equation Hx=y:

$$\begin{bmatrix} \theta_{rel} & 2 & 0 & 0 \\ (\phi_{rel}/2 - \theta_{rel}) & -1 & -1 & 1 \\ \theta_{rel} & 0 & 2 & 0 \\ (\phi_{rel}/2 - \theta_{rel}) & -1 & -1 & -1 \end{bmatrix} \begin{bmatrix} 1/\omega \\ \tilde{\rho}_1 \\ \tilde{\rho}_2 \\ \tilde{\epsilon}_{1,2} \end{bmatrix} = \begin{bmatrix} \Delta t_{X2S1F} \\ \Delta t_{X4S2R} \\ \Delta t_{X2S2F} \\ \Delta t_{X4S1R} \end{bmatrix} \quad (3)$$

Thus, x is the vector of transformed unknowns, y is the vector of measurements, and H is the matrix of coefficients that map the transformed unknowns onto the measurements. Then, an LMS filter can be used to recursively arrive at an estimated vector of transformed unknowns, $\hat{x}$;

$$e(k) = y(k) - H \cdot \hat{x}(k) \quad (4)$$

$$\hat{x}(k+1) = \hat{x}(k) + \mu \cdot H \cdot e(k).$$

Where e(k) is the error between the actual time measurements obtained, y(k), and the predicted measurements $H \cdot \tilde{x}(k)$, and $\mu$ is a constant scale parameter whose value is chosen to balance speed of responsiveness with stability. Note that the reciprocal of the first element of $\hat{x}$ is the rotor speed estimate that we are after and is expected to change significantly over time. The remaining three elements of $\tilde{x}$, which can be used to peer into the amount of uncertainty (e.g., sensor misalignment, machining error, etc.) affecting the measurement system, are expected to approximately constant over time. Note that, the lower the value of $\mu$, the more time required for the rotor speed estimates to converge. Therefore, a method is introduced to evaluate whether the three estimated parameters have sufficiently converged so that, when convergence has occurred, the LMS filter is replaced with direct calculation of rotor speed using an alternative reformulation of the equations in (1):

$$\frac{\theta_{rel} + 2\rho_1}{\Delta t_{X2S1F}} = \omega \quad (5)$$

$$\frac{(\phi_{rel}/2) + \epsilon_{1,2} - (\theta_{rel} + \rho_1 + \rho_2)}{\Delta t_{X4S2R}} = \omega$$

-continued $$\frac{\theta_{rel} + 2\rho_2}{\Delta t_{X2S2F}} = \omega$$

$$\frac{(\phi_{rel}/2) - \epsilon_{1,2} - (\theta_{rel} + \rho_1 + \rho_2)}{\Delta t_{X4S1R}} = \omega.$$

Each of the equations in (5) represents a calculation of the rotor speed from the converged estimated values of the parameters and the time measurements obtained from the sensor pulses. Depending on which edge of which sensor pulse has arrived (i.e., the falling or rising edge of $S_{R1}$ or $S_{R2}$), the corresponding equation in (5) is used to directly update the rotor speed estimate. However, under certain conditions (e.g., significant changes in temperature, sensor wear, input voltage, etc.), the sensor parameters may need to be re-calibrated using the LMS filter. Therefore, a routine parameter check can be scheduled once each day or so by applying the LMS filter, provided that conditions allow for it; otherwise, the solution should run the direct calculations in (5) until conditions change.

If only one sensor is deemed to be performing well, then the above procedure can be applied to the one working sensor by ignoring the pulses and parameters associated with the faulty sensor and applying the relevant equations in (1) and (2). For example, if $S_{R2}$ is determined to be faulty, the measurements that depend on the pulses from $S_{R2}$ (i.e., $\Delta t_{X2S2F}$, $\Delta t_{X4S2R}$, and $\Delta t_{X4S1R}$) as well as the associated parameters (i.e., $\rho_2$ and $\epsilon_{1,2}$) are ignored. The remaining measurements and their associated equations in (2) are used to form the following matrix equation:

$$\begin{bmatrix} \theta_{rel} & 2 \\ (\phi_{rel} - \theta_{rel}) & -2 \end{bmatrix} \begin{bmatrix} 1/\omega \\ \tilde{\rho}_1 \end{bmatrix} = \begin{bmatrix} \Delta t_{X2S1F} \\ \Delta t_{X2S1R} \end{bmatrix} \quad (6)$$

This equation is used with the LMS filter to estimate $\omega$ and $\rho_1$ and, upon convergence of $\rho_1$, the equations are reformulated to directly calculate $\omega$ at each rising and falling edge of the pulses from $S_{R1}$. The same can be done using only the measurements from $S_{R2}$ (i.e., $\Delta t_{X2S2F}$ and $\Delta t_{X2S2R}$). However, note that as the number of sensors used to estimate the rotor speed reduces, so will the update rate with which the rotor speed estimates can be provided.

In general, more than two sensors can be used to obtain a speed estimate. This would be necessary as the spacing between the targets increases sufficiently relative to the sensitivities of the sensors, and thus can be covered by more sensors in order to maximize the update rate of the speed estimates. With m sensors, the equations used as the basis of the solution are as follows:

$$\theta_{rel} + 2\rho_1 = (\omega \times \Delta t_{X2S1F}) \quad (7)$$

$$\phi_{rel} - (\theta_{rel} + 2\rho_1) = (\omega \times \Delta t_{X2S1R})$$

$$\theta_{rel} + 2\rho_2 = (\omega \times \Delta t_{X2S2F})$$

$$\phi_{rel} - (\theta_{rel} + 2\rho_2) = (\omega \times \Delta t_{X2S2R})$$

$$\vdots$$

$$\theta_{rel} + 2\rho_m = (\omega \times \Delta t_{X2SmF})$$

$$\phi_{rel} - (\theta_{rel} + 2\rho_m) = (\omega \times \Delta t_{X2SmR})$$

$$(\phi_{rel}/m) + (\epsilon_{1,2} - \epsilon_{m,1}) - (\theta_{rel} + \rho_1 + \rho_2) = (\omega \times \Delta t_{X4S2R})$$

-continued $$(\phi_{rel}/m) + (\epsilon_{2,3} - \epsilon_{1,2}) - (\theta_{rel} + p_2 + p_3) = (\omega \times \Delta t_{X4S3R})$$

$$\vdots$$

$$(\phi_{rel}/m) + (\epsilon_{m,1} - \epsilon_{m-1,m}) - (\theta_{rel} + p_m + p_1) = (\omega \times \Delta t_{X4SmR}),$$

which yields the following matrix equation of the form Hx=y to be used with the LMS filter:

$$\begin{bmatrix} \theta_{rel} & 2 & 0 & 0 & & 0 & 0 & 0 & & 0 & 0 \\ (\phi_{rel}/m - \theta_{rel}) & -1 & -1 & 0 & \ldots & 0 & 1 & 0 & \ldots & 0 & -1 \\ \theta_{rel} & 0 & 2 & 0 & \ldots & 0 & 0 & 0 & \ldots & 0 & 0 \\ (\phi_{rel}/m - \theta_{rel}) & 0 & -1 & -1 & & 0 & -1 & 1 & & 0 & 0 \\ \vdots & \vdots & & & & \vdots & & & & \vdots & \vdots \\ \theta_{rel} & 0 & 0 & 0 & \ldots & 2 & 0 & 0 & \ldots & 0 & 0 \\ (\phi_{rel}/m - \theta_{rel}) & -1 & 0 & 0 & \ldots & -1 & 0 & 0 & \ldots & -1 & 1 \end{bmatrix} \begin{bmatrix} 1/\omega \\ p_1 \\ p_2 \\ p_3 \\ \vdots \\ p_m \\ \tilde{\epsilon}_{1,2} \\ \tilde{\epsilon}_{2,3} \\ \vdots \\ \tilde{\epsilon}_{m-1,m} \\ \tilde{\epsilon}_{m,1} \end{bmatrix} = \begin{bmatrix} \Delta t_{X2S1F} \\ \Delta t_{X4S2R} \\ \Delta t_{X2S2F} \\ \Delta t_{X4S3R} \\ \vdots \\ \Delta t_{X2SmF} \\ \Delta t_{X4S1R} \end{bmatrix} \quad (8)$$

As sensors are determined to be faulty, the relevant rows and columns of H, x, and y can be removed above and the process can still be used. When two or one healthy sensors remain, the equations given for m=2 or m=1 above are used.

It is known that the recursive least squares (RLS) filter often converges faster than the LMS filter in general but is more computationally intensive than the LMS. Therefore, LMS is being desired over the RLS for this application.

Below the relationship between number of sensors/targets, update rate, and critical rotor speed is discussed:

The primary performance limitation of the proposed solution may be that the update rate of the solution is proportional to the magnitude of the rotor speed. Hence at low rpm, the solution is forced to wait some nontrivial amount of time between target detections, introducing a time lag in the speed and azimuth updates. However, by introducing multiple relative sensors at the optimal spacing (i.e., $$\frac{\phi_{rel}}{m},$$

where $\phi_{rel}$ is the spacing between the targets in degrees and m is the number of relative sensors), the update rate is reduced by a factor of m. Therefore, there is a direct relationship between the number of sensors, number of targets, rotor speed, and amount of time the solution is forced to wait between estimation updates. The critical rotor speed, $\omega_{cr}$, can be defined as the rotor speed below which the update rate falls below the requirement (i.e., the amount of time that we are willing to wait for an update), and can be directly calculated as follows $$\omega_{cr} = \frac{\phi_{rel}/m}{T_{req}} \cdot \left( \frac{1 \text{ rpm}}{6 \frac{\text{deg}}{s}} \right) = \frac{\phi_{rel}}{6 \cdot m \cdot T_{req}} = \frac{360/n_{rel}}{6 \cdot m \cdot T_{req}} = \frac{60}{m \cdot T_{req} \cdot n_{rel}} \quad (9)$$

where $T_{req}$ is the required update period from the sensor in seconds, and $n_{rel}$ is the number of relative targets. If this critical rotor speed is reasonable, then the number of sensors and targets are appropriate. If the number of targets, update rate requirement, and desired critical rotor speed are known, then the formula can be manipulated to calculate the required number of sensors:

$$n_{rel} \geq \frac{60}{m \cdot T_{req} \cdot \omega_{cr}} \quad (10)$$

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of estimation of rotor operational characteristics including rotor speed, rotor azimuth and rotation direction, of a rotating rotor of a wind turbine, the method comprising:
   measuring pulse rising edge time and pulse falling edge time of pulses generated by each of multiple proximity sensors originating from each of multiple detection targets arranged on the rotor;
   estimating values of parameters of the positioning and detection range of at least one sensor based on the measured pulse rising edge times and pulse falling edge times; and
   estimating rotor operational characteristics, including a rotor speed and a rotor azimuth and a rotation direction, based on the measured pulse rising edge times and pulse falling edge times and the estimated values of parameters of the sensors,
   wherein estimating a rotation direction comprises detecting which respective sensor of the multiple proximity sensors first detects a target,
   wherein estimating the rotor speed comprises mapping angular distances associated with pulses to corresponding time measurements, and
   wherein estimating the rotor azimuth is based on a previously calibrated rotor azimuth position increased or decreased, depending on estimated rotation direction, by an integral of the estimated rotor speed over the difference.

2. The method according to claim 1, further comprising:
   estimating values of parameters associated with the positioning and/or size of at least one target, based on the measured pulse rising edge times and pulse falling edge times;

estimating the rotor operational characteristics further based on the estimated values of parameters associated with the targets, and wherein estimating values of parameters associated with the sensors and targets includes estimating target diameters and/or target angular size of at least one target, and target relative angular spacing of at least one pair of targets, and/or sensor-target radial distance of at least one pair of sensor and target, and a sensor detection angular range of at least one sensor, and sensor relative angular spacing of at least one pair of sensors.

3. The method according to claim 1, wherein estimating rotor operational characteristics and estimating values of parameters associated with the sensors and/or targets is based on a measurement model, including a mathematical model relating the measured pulse rising edge times and pulse falling edge times to the rotor operational characteristics and/or parameters associated with the sensors and/or targets.

4. The method according to claim 3, wherein estimation of the rotor speed and the rotor azimuth and the rotation direction and/or the values of parameters associated with the sensors and/or targets is performed by applying an adaptive filter to the measurement model.

5. The method according to claim 1, wherein estimation of the rotor speed and the rotor azimuth and the rotation direction and parameters associated with the sensors and targets is based on at least one of:

measured times of pulses being high and times of pulses being low as detected by at least one sensor; and measured times between pulses as detected by at least one pair of sensors.

6. The method according to claim 1, wherein the targets comprise:

a reference target; and at least one relative target.

7. The method according to claim 1, wherein the sensors comprise:

at least one reference sensor; and at least one relative sensor, wherein pulses generated by the at least one reference sensor originate from detections of the reference target and pulses generated by the at least one relative sensor originate from detections of a relative target, wherein the at least one reference sensor, the at least one relative sensor, the reference target and the at least one relative target are positioned, in particular regarding a respective radial position, such that:

each of the at least one relative target is out of the sensor detection range of the at least one reference sensor; and each of the at least one reference target is out of the sensor detection range of each of the at least one relative sensor.

8. The method according to claim 6, wherein the reference target, a reference sensor, and a relative sensor are configured and positioned such that pulses originating from the reference target, as detected by the reference sensor, overlap in time with pulses originating from a relative target as detected by the relative sensor.

9. The method according to claim 6, wherein estimating the direction of rotation includes:

detecting whether a reference sensor or its associated relative sensor first detects its corresponding target.

10. The method according to claim 6, wherein a reference azimuth position is detected when a reference sensor detects a pulse originating from the reference target, wherein a mounting position of the reference sensor is determined by calibration using external azimuth measurement.

11. The method according to claim 6, further comprising:

determining a difference between subsequent pulse rising edge and/or pulse falling edge times, the first and second pulse edge times detected by any of the at least one relative sensor and originating from any of the at least one relative target.

12. The method according to claim 1, further comprising:

validating of at least one of the sensors by making a consistency check of measurement results of this sensor and the estimated rotor speed and/or estimated rotor azimuth; and disqualifying of one sensor, if it does not pass the consistency check.

13. The method according to claim 12, further comprising, if only one sensor passes the consistency check:

estimating the rotor speed based on pulse high and pulse low time measurements of only the sensor having passed the consistency check.

14. An arrangement for estimation of rotor operational characteristics, including rotor speed, rotor azimuth and rotation direction, of a rotating rotor of a wind turbine, the arrangement comprising:

multiple proximity sensors; and a processor, wherein the processor is configured:

to measure pulse rising edge time and pulse falling edge time of pulses generated by each of multiple proximity sensors originating from each of multiple detection targets arranged on the rotor;

to estimate values of parameters of the positioning and detection range of at least one sensor based on the measured pulse rising edge times and pulse falling edge times, and to estimate rotor operational characteristics, including a rotor speed and a rotor azimuth and a rotation direction, based on the measured pulse rising edge times and pulse falling edge times and the estimated values of parameters associated with the sensors, wherein estimating a rotation direction comprises detecting which respective sensor of the multiple proximity sensors first detects a target, wherein estimating the rotor speed comprises mapping angular distances associated with pulses to corresponding time measurements, and wherein estimating the rotor azimuth is based on a previously calibrated rotor azimuth position increased or decreased, depending on estimated rotation direction, by an integral of the estimated rotor speed over the difference.

15. A wind turbine, comprising:

a rotor in which plural rotor blades are mounted, and an arrangement, the arrangement having multiple proximity sensors and a processor configured to:

measure pulse rising edge time and pulse falling edge time of pulses generated by each of the multiple proximity sensors originating from each of multiple detection targets arranged on the rotor;

estimate values of parameters of the positioning and detection range of at least one sensor based on the measured pulse rising edge times and pulse falling edge times, and estimate rotor operational characteristics, including a rotor speed and a rotor azimuth and a rotation direction, based on the measured pulse rising edge times and pulse falling edge times and the estimated values of parameters associated with the sensors, wherein estimating a rotation direction comprises detecting which respective sensor of the multiple proximity sensors first detects a target, wherein estimating the rotor speed comprises mapping angular distances associated with pulses to corresponding time measurements, and wherein estimating the rotor azimuth is based on a previously calibrated rotor azimuth position increased or decreased, depending on estimated rotation direction, by an integral of the estimated rotor speed over the difference.

* * * * *